Dec. 31, 1935.    M. MAUL    2,025,764
RECORD CARD CONTROLLED MACHINE
Original Filed June 11, 1931    4 Sheets-Sheet 1

Fig. 1

Inventor:
Michael Maul

Dec. 31, 1935.  M. MAUL  2,025,764
RECORD CARD CONTROLLED MACHINE
Original Filed June 11, 1931  4 Sheets-Sheet 4

Inventor:
Michael Maul

Patented Dec. 31, 1935

2,025,764

UNITED STATES PATENT OFFICE 2,025,764

RECORD CARD CONTROLLED MACHINE

Michael Maul, Berlin-Johannisthal, Germany

Original application December 27, 1932, Serial No. 649,000, which in turn is a division of Serial No. 543,599, June 11, 1931, now Patent No. 2,003,636. Divided and this application August 2, 1933, Serial No. 683,364. In Germany June 14, 1930

30 Claims. (Cl. 235—92)

The present invention relates to perforated record card controlled machines and more particularly to machines equipped with a punching mechanism. The invention employs a storing device and means for reading the result stored in said storing device; preferably an accumulator is used as a storing device and the storing result reading means are then the total taking means. It will therefore be understood that an accumulator affords in connection with the present invention the same advantages as any other type of storing device and in the following specification reference will chiefly be made to an accumulator as a preferred storing device. Though the machine according to the invention may also be used in connection with printing means, the present case relates only to storing or accumulating respectively and punching whereas other features of the invention are claimed in my United States Patents 2,003,636 and 2,003,637. This application is a division of an application filed December 27, 1932, Serial No. 649,000 (now Patent No. 2,003,637) which was a division of an application filed June 11, 1931, Ser. No. 543,599 (now Patent No. 2,003,636).

Now, it is one of the main objects of the invention to make provisions, in an automatic record card controlled machine, to set the record card controlled accumulating and punching means under the influence of an automatic group control mechanism and to control said punching mechanism by said accumulating means upon automatic total taking whereupon the subsequent card group is automatically fed through the machine.

A further object of the invention is to suppress in a group controlled tabulating machine the control of the accumulating means after the passage of the first card of each group while the punching mechanism is controlled by each record card, and to control said punching mechanism by the accumulating means upon total taking.

A further object of the invention is to suppress in a group controlled tabulating machine the control of the accumulating and punching means after the passage of the first card of each group, and to control said punching mechanism by the accumulating means upon total taking.

A further object of the invention is to suppress in a group controlled tabulating machine the control of the accumulating means after the passage of the first card of each group, and to control said punching mechanism by the accumulating means only upon total taking.

Another object of the invention is to provide in a machine of the type referred to a punching mechanism for a continuous record sheet and means for automatically shifting said record sheet in accordance with the card passage and/or total taking as required.

Still another object of the invention is to provide in a machine of the type referred to a punching mechanism for combinational code perforations.

Still another object is to provide a punching mechanism for combinational code perforations, adapted to produce said perforations in a continuous record sheet automatically shifted past said punching mechanism. These combined features permit a favourable arrangement of the perforations upon the record sheet, particularly when the latter is also provided with printed characters.

Still a further object of the invention is to provide an automatic group controlled tabulating machine wherein the group number is punched upon each total taking operation upon perforations receiving record fields which are automatically fed one by one to punching position in accordance with the group changes of the cards running through the machine.

Still another object of the invention is to make provisions in an automatic group controlled tabulating machine to punch the group number upon automatic total taking simultaneously in a plurality of digital orders.

Further objects and advantages of the invention will be seen from the following specification and the claims and the accompanying drawings which illustrate a preferred embodiment of the invention in connection with an automatic record card controlled punching and printing tabulating machine.

The machine according to the invention may be advantageously employed for various purposes, however, it is particularly adapted for carrying out a novel method for preparing statements and the like, as described in my United States Patent No. 2,002,437.

The illustrated embodiment shows in addition to the perforating mechanism more or less diagrammatically the essential parts of a known electrical tabulating machine in which the cards are fed through the machine one by one and are analyzed by analyzing brushes which in turn control the printing and accumulating mechanisms of the machine in accordance with the perforations of the cards. The accumulator is electromagnetically engaged in a known way and mechanically rotated, and the printing mechanism is reciprocating either horizontally or vertically and is provided with a number of type bars corresponding to the number of columns of the record card, said bars being upon item printing under the control of the cards or upon total printing under the control of the accumulator mechanism. Since the mechanical parts of such a machine are generally known and since such a machine is described in several patents (such as for instance in the United States Patent No. 1,600,413 and Reissue-Patent No. 16,304), the present specification will refer only to the most essential parts and the general operation of the machine will be described in connection with the circuit diagram.

Figure 1:
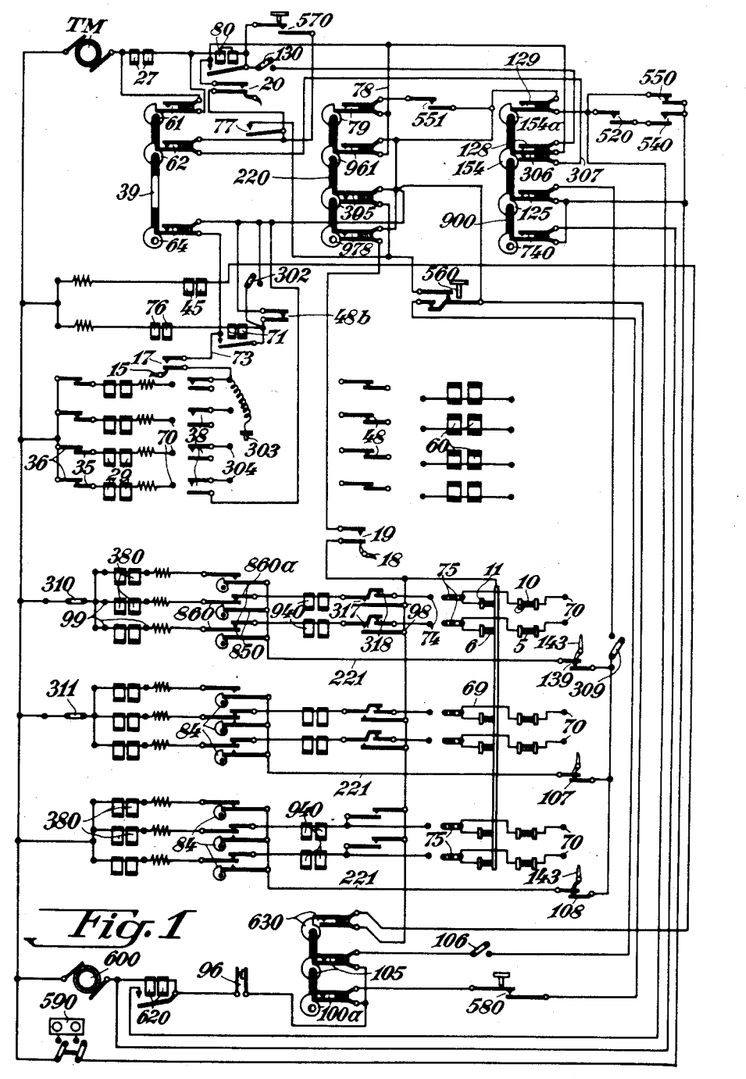
Fig. 1 shows a circuit diagram of an electrical tabulating machine in which a perforating mechanism is provided.
Figures 2, 3, 4:
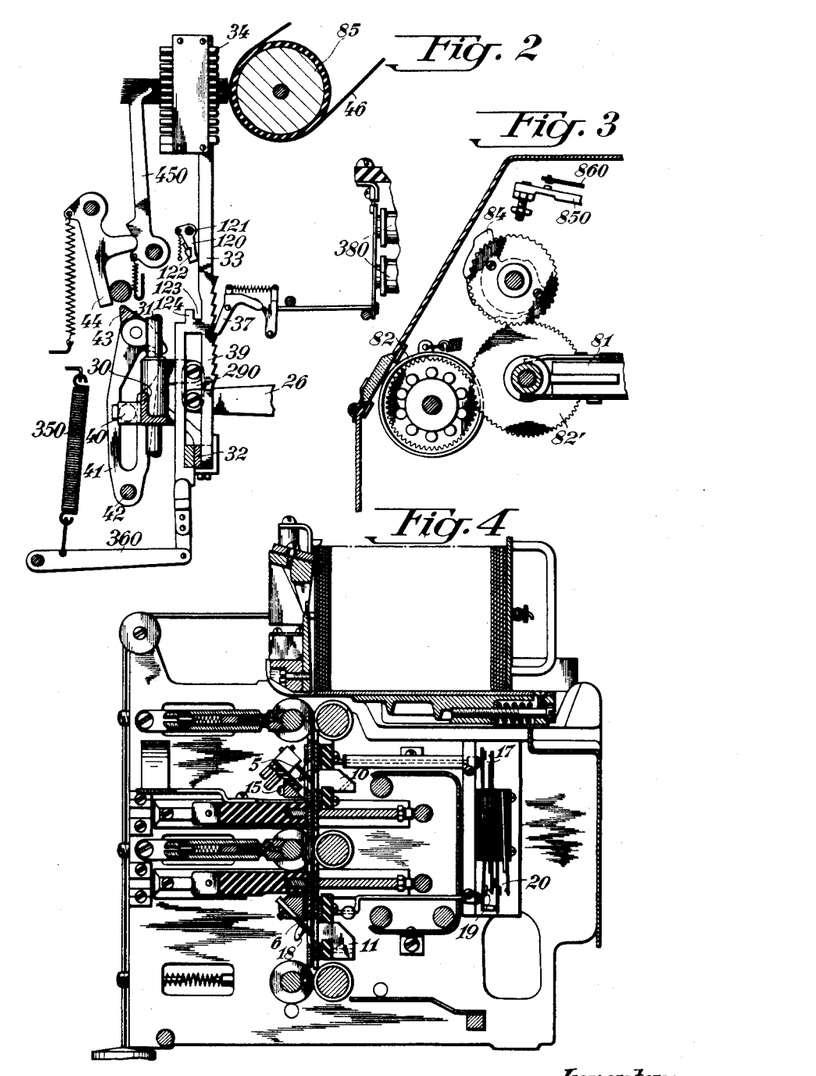
Fig. 2 illustrates the known printing device of a tabulating machine, said device being shown for one record column only.
Fig. 3 shows the known arrangement of an accumulator wheel being under the control of the perforated record cards, said accumulator wheel
Fig. 4 shows a section through the card analyzing mechanism of the machine.

The accumulator mechanism is shown diagrammatically in Fig. 3 in which the accumulator wheel is indicated at 82; said wheel is driven by a wheel 82' which may be engaged by means of a coupling lever 81 with the continuously rotating driving shaft. The clutch lever 81 is electromagnetically controlled by the accumulator magnet 940 (Fig. 1) of the respective record column, and will be disengaged at the end of the card passage so that the amount represented by the perforation will have been entered into the accumulator wheel 82. Simultaneously with the accumulator wheel 82 the cam wheel 84 is rotated by the driving wheel 82', the height of the steps of said cam wheel corresponding to the adjustment of the accumulator wheel 82. The cam wheel 84 is analyzed by means of contact devices 850, 860 (Fig. 3) which in turn control the printing magnets 380 (Fig. 1) in accordance with the adjustment of the accumulator so that the respective total will be printed.

The printing mechanism may be under the control of the record cards for item printing as well as under the control of the aforesaid contact mechanism 850, 860 for total printing. The printing mechanism for one place (corresponding to one record column) is shown in Fig. 2. From this figure may be seen that the reciprocating lever 26 is connected by link 290 with a cross head 30 being movable along vertical bars 31 and receiving a vertical movement by the aforesaid lever 26. At the opposite end of the mechanism the cross head is also connected to a link 290 and lever 26 respectively. From the cross head 30 extend arms carrying a cross beam 32 passing through a number of slotted type bars 33; each type bar 33 carries on its head a number of type 34 being movable in vertical direction and corresponding to the ten numerals 0–9. The bars 33 are normally drawn upwardly by spiral springs 350 which are connected to levers 360; the bars 33 are therefore held in engagement with the cross beam 32 and will follow the upward movement of the latter (which the same receives by levers 26) until they are arrested by pawls 37 which are under the control of magnets 380, said pawls engaging into the notches 39 of the bars 33. The spacing of the notches 39 corresponds to the spacing of the movable type 34 and the movement of the bars 33 under the control of levers 26 is effected in synchronism with the passage of the record card under the analyzing brushes; if therefore the brush encounters a hole, the coordinated magnet 380 will be energized and thereby the bar 33 will be arrested at a point of its upward movement at which the type corresponding to the perforation is in printing position and the bar will be held there until printing has been effected.

The cross head 30 has rearwardly extending projections with rollers 40 engaging into slots of levers 41 which are pivotally mounted at 42; if the cross head rises, said levers will be moved rearwardly due to the shape of said slots and the cross beam 43 will therefore be moved to the left in engagement with the pivotally mounted spring acuated levers 44; the latter will be pressed rearwardly thus moving a number of spring actuated printing hammers 450 away from the type. At the end of the upward movement of the cross head 30, however, the bar 43 will be drawn downwardly and escapes from the ends of the levers 44; since the same are then all simultaneously released they will be drawn by their springs in clockwise direction so that the printing hammers will impel the selected type against the platen 85. The type will therefore print upon the record sheet 46 the numeral corresponding to the perforation.

Figures 5, 6, 7:
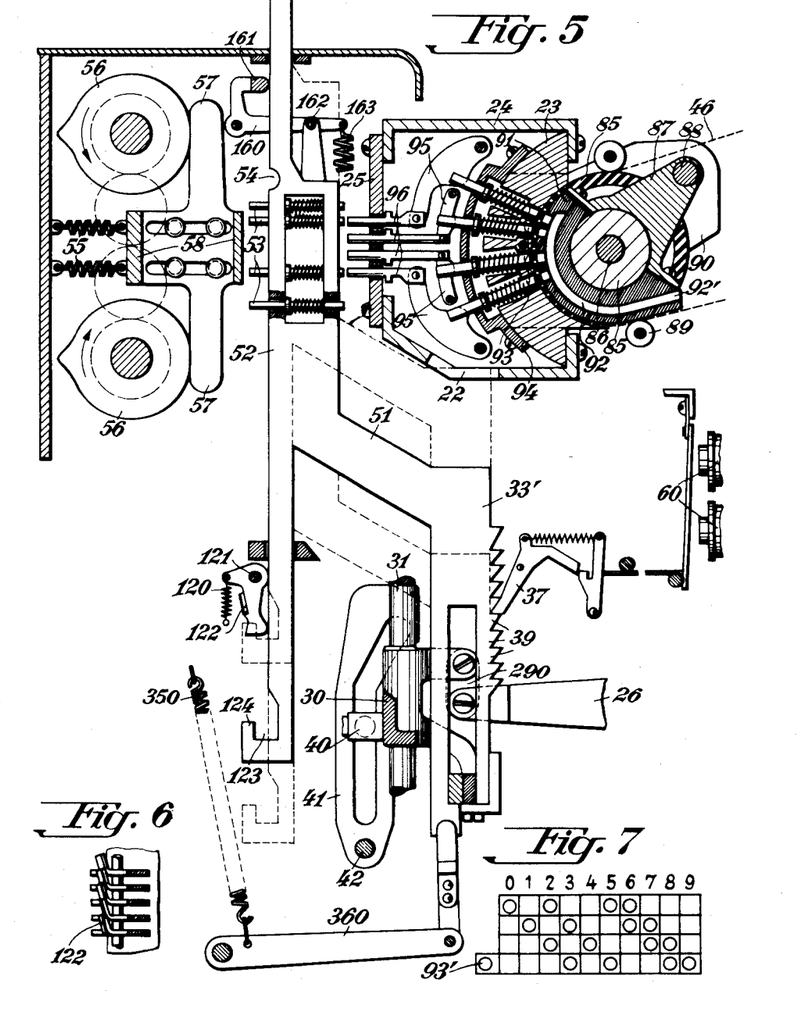
Fig. 5 represents in an enlarged scale (as compared to Figs. 2–4) a section through the perforating mechanism and shows the means for controlling the perforation in a single column.
Fig. 6 shows the device for the automatic zero printing and zero perforation.
Fig. 7 shows the perforation code according to which the different numerals are represented by combinational code perforations.

For the suppression of zero printing in the places to the left of the highest numeral place and for automatic zero printing in the places to the right therefrom, there is a zero controlling mechanism provided which is shown more in detail in Figs. 2 and 6. This controlling mechanism comprises a lever 120 for each type bar, said levers being pivotally mounted at 121. Each lever has an arm 122 extending over the lever to the left thereof. If the lower ends of the levers 120 catch into a notch 123 of the bars 33, the bars are permitted to move upwardly to a point where an idle type is in printing position; however, if the levers 120 do not engage into said slots, the type bars are arrested by a projection 124 in a position being for one unit lower and in this position the type bars will hold the zero type in printing position so that in all the respective places zeros will be printed. It will be seen that due to the superposition of the levers 120 in all places being to the right of the highest numeral place, zeros will be automatically printed, in item as well as upon total printing, i. e. independently of the control of the type bars by the record cards or by the accumulator in case there is no other numeral type adjusted, and that in places being to the left of the highest numeral place the type bars will be moved to the highest position since in said places the arms 122 are permitted to move freely into the slots 123 so that in said places no printing will be effected at all.

Though the perforating mechanism is an essential part of the tabulating machine according to the invention at first the operation of the tabulating machine without the perforating mechanism will be described in connection with the circuit diagram and thereafter the perforating mechanism will be described as well as its operative connection with the parts of the tabulating machine and more particularly with the accumulating mechanism.

By depression of the start key at 570 (Fig. 1) the current circuit will be closed from the main line through the tabulator motor TM, leading then over the clutch magnet 27, motor relay 80, start contact 570, motor control relay contact 77, cam contact 305 (now being closed), cam contact 129 and contacts 550 to the other main line of the current source. If only item printing is to be effected, the same current circuit as mentioned before will be closed with the only exception that the current will then flow from the cam contacts 129 through the contacts 520 and 540 to the other main line, and the machine is operated at a lower speed. It is to be mentioned that the cam contacts 61, 62, 64 are all controlled in unison by means of shaft 39 which rotates synchronously with the other parts of the machine. The cam contacts 305 are controlled by shaft 220 rotating synchronously with the shaft 39. The cam 154a for contact 129 is fast upon shaft 900 of the printing mechanism. Consequently, if only the accumulator mechanism is in operation and no item printing is effected, this shaft will be in rest position. It will only be operated upon total printing and resetting of the accumulators. The automatic group control mechanism comprises in the illustrated embodiment four group indicator contacts 48 and a contact 48b; another contact serves to control the control relay 71 and contact 48 serves to complete the current circuit if the accumulator is only to be used for group indicating without any automatic group control. The first of the last mentioned contacts energizes relay 71 if all contacts are closed, the relay remaining then closed under the influence of a cam controlled contact 64 as will still be described.

Card feeding is initiated either automatically or manually by the start key 570 and the cards run through the machine one by one as soon as the clutch magnet 27 connects the card feeding mechanism with the drive of the machine. If the cards run one by one through the slot 13, 14 (Fig. 4) nothing will happen until the first card comes under the lower brushes 6 and closes by means of card lever 18 the contacts 19 and 20 after the contacts 17 have been previously closed by the other card lever 15. If it is now assumed that only cards belonging all to the same group are running through the machine the controlling holes under the upper and lower brushes will pass at the same time under said brushes. This will establish a current circuit from a lower brush 6 to the contact block 11 and then through line 69 to the contact block 10 of the corresponding upper brush and from there to brush 5. The current circuit leads from the upper brush to the plug contact 70 of the plug board; for reasons of clarity the plug connections which are normally to be made are not shown in the diagram. The current may then flow through one of the control magnets 29 back to the current source; the energized control magnet will interrupt the contacts 35, 36 to take the spark from the brushes and simultaneously the contacts 38 will be closed which complete a part of the shunt circuit including the control relay 71. The same operations will take place during the passage of the remaining cards at the brushes inserted into the group control circuit so that the shunt circuit will be completed. During the machine cycle the cam contacts 64 are instantaneously opened which, however, has no effect upon the relay 71 since the current circuit 73 is still closed by contacts 38 while in the other case the current circuit of the relay would be interrupted. The plug 303 may be inserted into any one of the contacts 304 in order to exclude one or plurality of control circuits if less than the total number of the existing group control units are required.

At the end of the passage of the first card under the lower brushes the cam controlled contacts 630 will be closed, thereby causing a current impulse through the group indicator magnet 45 which releases a lever not shown in the drawings and permits a bar to open all contacts 48 as long as the card run through the machine is not interrupted so that said contacts will remain open. It is still to be mentioned that the group indicator contacts 48 are inserted between the points 74 and 75 to prevent entering of group data of the following cards into the accumulator after the group number has once been entered into the accumulator from the first card.

From the foregoing will be seen that the group controlling circuit remains closed as long as consecutive cards are in agreement and consequently the machine will continue in its operations. If it is now assumed that the last card of a group has passed under the upper brushes and is about to come under the lower brushes, the first card of the following group will be under the upper brushes; since both cards are provided with different group numbers the aforesaid controlling circuit will be interrupted between the upper brushes 5 and block 10 thereby interrupting also the current circuit 69 and preventing energization of magnets 29. Consequently, the contact 38 and the current circuit 73 will remain open so that upon opening of contacts 64 the relay 71 will be deenergized and will interrupt the current circuit of motor relay 76, thereby opening the contacts 77. These contacts are shunted to the circuit 78 and are inserted in mere tabulating operations (accumulating without printing but with total printing) over cam contacts 961 and upon total printing over cam contacts 79; said contacts open at the end of the machine cycle and consequently the motor relay 80 and also clutch magnet 27 will be deenergized so that the machine will be stopped.

If total taking is to be effected manually, the switch 136 must be opened (as shown in the drawings) and the reset key 580 must be depressed. Then a current will flow from the current source 599 through contacts 550 (during tabulating operations) or contacts 540, 520 (upon item printing), then through contacts 129 now being closed, through the various lines to the reset key 580, the contacts 100a now closing, the clutch magnet controlled contacts 96, reset magnet 620, reset motor 600 to the other main line and back to the current source. The cam contacts 100a, 105 and 630 are provided upon a shaft rotating synchronously with the shafts 39 and 220. The reset motor 600 causes printing of the total and resetting of the selected accumulators as is usual in tabulating machines. After total taking and resetting has been initiated by the reset key 580, the current is taken over from the reset motor by a relay controlled magnet 620 short circuiting the reset key 580. After total taking and resetting the magnet 620 will be short circuited. The control of the printing and resetting motor is governed by contacts 740 being provided upon shaft 900 rotating once during the printing and resetting cycle. Said contacts open at the end of the printing and resetting cycle the current circuit to the motor 600 and prevent thereby further rotation of the motor. The means for taking at first the total and then resetting the accumulators are controlled by magnet 620 as is explained in prior patents. It must still be mentioned that the contacts 96 prevent printing and resetting while the tabulating motor TM is running and has energized the clutch magnet which opens the contacts 96.

If the total is to be taken automatically the switch 106 must be closed. Then the contacts 105 which initiate printing and resetting will be closed (just before the machine is stopped automatically under the control of the group controlling mechanism) and printing and resetting will then be effected in the above described way. The current circuit of the switch 106 leads over the contacts which are under the control of stop key 560; if said contacts are open total taking cannot be automatically initiated.

After a total has been taken either automatically or by key actuation, restarting of the machine for the next card group may be effected either automatically or manually. For the manual release only the start key 570 must be depressed thereby initiating another machine cycle as has been described. In order to effect an automatic restart of the machine, the total switch 130 must have been closed before. Another start circuit will be closed over said switch as follows: From the current source 590 through tabulating motor TM, clutch magnet 27, motor relay 80, switch 130, cam contacts 128 being closed at the end of the printing and resetting cycle by cam 154, around motor relay 80, through the lower card lever contact 20 (now being closed since there are cards in the machine), through motor relay controlled contacts 77 (now being closed) then either through cam contact 305 or interrupter contacts to the cam contacts 129 (now being closed), through one of the contacts 550 or 520–540 to the other side of the line and back to the current source. Said current circuit will automatically initiate another machine cycle. The machine will then continue in its operations since the contacts of motor relay 80 remain closed until they are opened again at the end of the next card group under the influence of the automatic group control mechanism, whereupon total taking, resetting and restarting of the machine may again be initiated in any one of the above described ways.

If the card supply is exhausted, the accumulation of the data of the last card will be completed in the known way and then total taking will be effected; this, however, needs no further explanation in connection with the present invention since the respective operations are described in the above mentioned prior patents. The cam contacts 630 serve to release the current impulse to the group indicator magnets 45 at the proper moment in the machine cycle. The cam contacts 125 serve for the control of the current supply to the current circuits 221 leading to the total taking contacts 850 and 860 which are controlled in the known way by the cams 84; the printing magnets 380 are in series with the contacts 860.

In order to permit printing of the total from any of the accumulators at will, there are provided three contacts 108, 107 and 139 which are controlled by levers 143. If said contacts are open the printing current circuits of the coordinated accumulators will be interrupted thereby preventing total taking. If it is desirable to switch off simultaneously all total taking magnets, the switch 309 can be opened thereby interrupting the current circuit of the cam contacts 125. In the present embodiment the printing magnets are in series with the accumulator magnets 940 and if a controlling impulse is released both magnets will be energized simultaneously. The adjustment of the machine either for item printing and accumulation or accumulation only may be controlled by a special lever which controls also the drive mechanism of the machine. This mechanism as well as further details, however, is clearly described in the prior patents so that no further explanation is necessary in the present specification.

The switch 302 shown in the diagram serves to close a current circuit which prevents in any way automatic group control; this is desired if the machine shall only accumulate the data or or if only item printing shall be effected independently of the group designations of the cards.

The switches 310 and 311 serve to permit tabulation if they are closed; if the switch 302 is closed the automatic group control mechanism is switched off. If the switch 302 is open as illustrated and switch 310 is closed, group control will be effected in the record columns coordinated to the accumulator as far as corresponding plug connections have been made.

In a printing tabulating machine the accumulator wheels control total taking while item printing is effected by the record cards. The accumulator magnets 940 which are energized by the holes and which are adapted to engage the accumulator wheels close a shunt circuit about the brushes over the contacts 317. This is for a double purpose, on the one hand to take the spark from the lower brush 6, and on the other hand to maintain the current circuit through the accumulator magnet 940 and the printing magnet 380. If now the automatic group control shall be effected, the same devices are used. By energization of magnets 940 the main current circuit of the brushes will be interrupted by contacts 318, and simultaneously the shunt circuit will be established through contacts 317. Due to the interruption of the contacts 318 back circuits through the holes of the upper card are prevented.

Bell crank levers 143 are coordinated to the contacts 108, 107 and 139 for the selective control of total printing from the various accumulators; said levers are under the control of the reset clutches as has been described in the above mentioned prior patents. If the reset clutch of any accumulator is moved to the left, resetting of the corresponding accumulator will be prevented by simultaneously opening the coordinated contacts 106, 107 or 139, and accordingly also total taking from the respective accumulator which is not reset will be prevented. If on the other hand the clutch member is adjusted in the right hand position, the accumulator will be reset and the corresponding switch will be closed so that also a total will be taken from said accumulator. In the generally known way provision may also be made to take a total without resetting the accumulator.

Now, reference will still be made to some general operations of the machine: If the machine is to be used only for mere accumulating (without printing any items) the tabulator will operate in the usual way with a higher speed, and by means of a shiftable speed mechanism the contacts 520–540 will be opened. At the same time, the operator of the machine will open the switch 309 which prevents total printing. The machine may then operate as ordinary computing machine and the printing mechanism will be idle during the accumulation. Upon resetting, the printing mechanism will perform one cycle, but since the total taking circuits are not closed no printing will be effected.

If it is desirable to accumulate the data of each card group and to print the total of each group, the switch 309 must be closed so that total printing at the end of each card group will be permitted. During such accumulating operations, item printing will be entirely suppressed and during the printing operations only the total of the previously accumulated items and the coordinated group number will be printed.

The above described manner of operation may be performed either fully or semi-automatically. For instance the data of a stack of cards may be accumulated and if the switch 302 for the automatic group control is open the accumulation will be automatically interrupted if the card group changes. Total taking may then be initiated manually by depressing the key 580 or automatically (if the switch 106 has been previously closed). After total taking (either automatically or manually) the tabulating machine may be restarted either automatically or manually. In the latter instance it is only necessary to depress the start key 570 while in order to cause automatic restart the switch 130 must have been closed. If said switch is in closed position the initiation of another machine cycle will be automatically effected by the cam contact devices.

If it is desirable to print items, the printing mechanism is rendered operative through the printing lever as has been described in the prior patents. Simultaneously therewith the speed control mechanism will be shifted so that the corresponding contacts will be opened and this will cause operation of the tabulator with a lower speed. It is then possible to print the various items and to accumulate the same as well as to print the respective totals. It will be seen that the group numbers serve for the control of the operation of the machine and also for the control of total taking and that in the described embodiment they are not entered into the accumulator from each card; the group number is printed adjacent the first item and then no further printing will take place until the total is taken when the group number will again be printed adjacent the total. The group number may, however, also be printed to each individual item, but then the group indicator contacts 48 are not inserted into the analyzing circuit; with this manner of operation the group number will not be printed together with the total.

Figure 9:
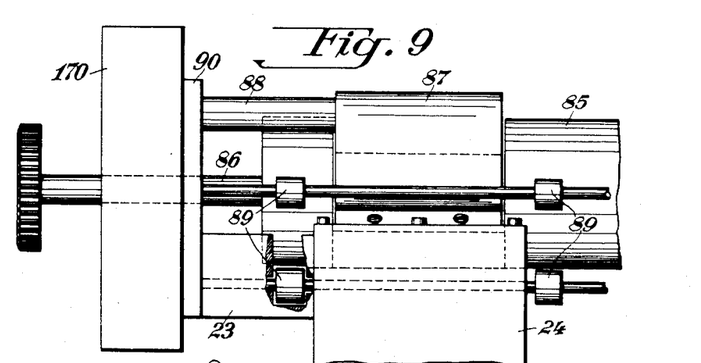
Fig. 9 is a top view on the left hand portion of the platen roller and the perforating mechanism of the tabulating machine.

The perforating mechanism which is provided according to the present invention in the tabulating machine, comprises a number of perforation units, one unit being provided for each record column to be punched as is for instance shown in Fig. 5. From Figs. 5 and 9 may be seen that at the one end (preferably at the left end) of the printing roller 85 there is a groove provided in said roller in which a matrix block 91 is located; the latter is rigidly connected to a holder 87 in such a way that the inner stump of the platen is permitted to revolve freely in the boring between 81 and 87. The holder 87 is rigidly connected by a bar 88 with a plate 90 being connected to the bearing 170 of the platen; to the plate 90 is also the punch carrier 23 fastened. It will be seen that the record sheet 46 is free to move between the punch carrier 23 and the matrix block 91. Through the punch carrier 23 passes a guide bar of the guide rollers 89 for the record sheet and similar guide rollers are provided above and below the platen at both sides of the punching mechanism so that the record sheet is fed safely by the rotating platen between the stationary matrix block 91 and the stationary punch carrier. The matrix block 91 has a hollow space 92 extending axially to the platen over all rows of punching stamps and terminating into a pipe 92' being preferably connected to a line permitting to remove the waste from the space 92. The punch carrier 23 comprises for each record column four resiliently mounted punching stamps 93 being symmetrically arranged above and below the printing line and being normally held by a cover plate 94 in the position shown in the drawings. The punching stamps 93 are slotted at their outer ends and into said slots engage pivotally mounted levers 95 being connected with slides 96 which extend through the guide plate 25 of the punching stamp casing 24 to the outside of said plate. The distance of the slides 96 from each other corresponds exactly to the distance of the notches 39 of the punching stamp carrier bar 33', 51, 52 and the notches 39 in turn correspond exactly to the similar notches of the type bar shown in Fig. 2. For the representation of a certain numeral, the punching stamps 93 are depressed by means of the slides 96 either singly or in different combinations in order to punch a combinational code perforation in the record sheet 46. The selection of the punching stamps is effected in accordance with the numeral to be punched in a similar way as the selection of the printing type in Fig. 2. For each record column there is a notched bar 33' provided which is drawn upwardly by means of a spring 350 in a similar way as the type bar of the printing mechanism in Fig. 2; each punch bar may be arrested in different positions by the pawl 37 under the control of the selector magnet 60. The bar 33' is connected with the bar 52 by a cross piece 51 and the bar 52 carries four resiliently mounted pins 53 which are spaced as shown in the drawings. If the bar 52, 33' is in the lowermost position, the uppermost pin 53 is just for one tooth 39 below the lowermost slide 96, and if the bar 52 is in its uppermost position (the lowermost and uppermost positions are indicated by dotted lines) the lowermost pin 53 is for one tooth 39 above the uppermost slide 96. In all intermediate positions, however, one or a plurality of the pins 53 will be adjusted opposite the slides 96 and if then in the way still to be described the plate 58 is moved to the right, the selected punching stamp or punching stamps 93 respectively will be depressed under the control of the pins 53 and the slides 96, 95 through the record sheet 46, and upon return movement of the plate 58 the punches will also return under the influence of their springs to their home position. The perforation code with respect to the various positions of the bar 33 may be clearly seen from Fig. 7 and may be verified in connection with Fig. 5; in Fig. 5 the punching bar is so adjusted that the numeral "5" will be punched, in accordance with Fig. 2 in which the type "5" is in printing position. For reasons of clarity it is still to be mentioned that the hole positions pass in the sequence 9 to 0 under the brush and that consequently also the type and punching stamp bars must rise in the same sequence from the lowermost to the uppermost position through the various numerical positions. The adjustment of the selector bar 33' is effected by the selector magnet 60. During the machine cycle the type bars 30 (Fig. 2) and simultaneously therewith also the punching bars 33' are raised by the same mechanism which has been previously described. At the end of the machine cycle, and at the same moment in which in the printing mechanism the type hammers are impelled towards the record sheet, the peaks of two cams 56 rotating once during each machine cycle will encounter the fingers 57 of a frame 58 being guided upon pins of the casing, said frame being normally held by springs 55 in engagement with the cams 56. The peaks of the cams 56 will move the frame 58 and the pins 53 lying just opposite said frame to the right, and consequently also the slides 96 and levers 95 will be moved far enough to press the corresponding punching stamps 93 through the record sheet 46 while all other punching stamps, i. e. those punching stamps to which no pins 53 are coordinated between their slides 96 and the plate 58 will be inoperative and no perforation will be caused thereby. After perforation has been effected and printing has taken place in the previously described way, all parts will return to their home position and consequently also the punching bars 52, 33' will return under the influence of the cross head 30 to their home position.

Controlling of zero punching upon item perforation as well as upon perforation of a number under the control of the accumulator is effected (in a similar way as has been already explained in connection with the type bar) by means of a pivotally mounted lever 120 encountering either a recess 123 or a projection 124. Consequently, in all places being to the right of the highest numerical place the zeros will be automatically punched while in all places to the left thereof the bars 52 will raise for one unit higher so that the lowermost pin 53 moves beyond the uppermost slide 96 and consequently no perforation will be effected at all in the respective punching column.

Figure 8:
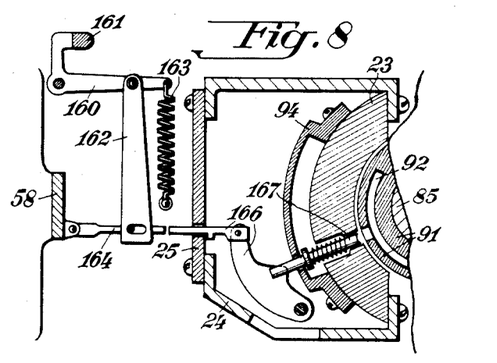
Fig. 8 is a section through the perforating mechanism at the extreme left perforating place in which a standard point hole for the combinational code perforations is produced.

The distance of the perforation from the side edge of the record sheet determines the denominational value of said perforation, however, the meaning of the perforation is thereby not yet unequivocally determined. For this purpose there is a special standard point punching stamp provided which produces, each time a record perforation is effected, a hole on the same predetermined position which hole is invariably at the level of the lowermost hole position of the record perforation and which is therefore adapted to serve as a reference point for the meaning of the hole combinational records. The device for producing the standard point hole may be seen from Figs. 5 and 8. On opposite side walls of the casing are two bell crank levers 160 (in the drawings is only shown the lever lying on the one side) pivotally mounted which are connected with each other by a cross bar 161 which is normally drawn by a spring 163 against the left edge of the bars 52. Each bar 52 has a recess 54 which is just opposite the yoke 161 if the bar 52 is in its uppermost position (i. e. one step above the zero position). The recesses 54 of all perforation bars 52 will therefore be just opposite the yoke 161 if all bars 52 are in their uppermost position, i. e. if no record perforation will be effected at all. In this instance the spring 163 will draw the yoke 161 into the recesses 54 and consequently the bell crank levers 160 will be rocked so that also (see Fig. 8) the arm 162 will be drawn downwardly and the arm 164 connected therewith by a pin and slot connection will be moved downwardly. Said arm 164 as well as the arm 162 are, of course, to the left of the extreme left punching column; the arm 164 is pivotally connected with the punching plate 58 and lies normally opposite of a slide 166 adapted to cooperate with the standard point hole punching stamp 167.

The cams 56 rotate, of course, only during printing cycles so that only then perforation will be effected provided the bars 52 are adjusted in punching position. If now for instance in connection with total taking no perforation shall be effected, the selector magnets 60 will not be energized and all bars 52 will raise to their uppermost position so that in each of such cycles the arm 164 (Fig. 8) is rocked lower than the slide 166; consequently, if the bars 52 are in their uppermost position there will be neither a record perforation nor a standard point hole perforation effected; however, if through one or a plurality of the bars 52 a record perforation is effected, the lever 160 is prevented to rock in clockwise direction so that simultaneously with each movement of the plate 58 to effect a record perforation also a standard point hole will be punched.

Figure 10:
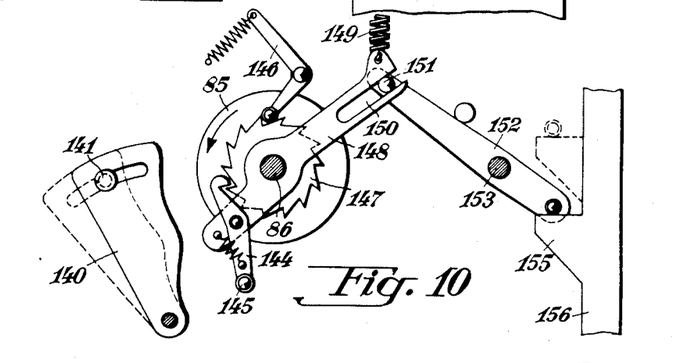
Fig. 10 shows the record sheet feeding mechanism of the machine, said mechanism being adjustable to feeding steps of different length.

As will still be explained, with group accounts and printing of each individual item, the group designations are usually punched only to the first item of each group so that in such accounts the space required for the perforations needs no particular consideration since the printed entries upon said group accounts require in any way a longer record sheet than is required for the perforation. However, if only totals are to be printed or if a perforation shall be entered to each item, the record sheet must receive larger feed steps since the perforation requires a larger space in vertical direction than the printed line. The device serving for this purpose is illustrated in Fig. 10 showing the device adjusted for normal linewise type printing. The lever 156 having a projection 155 is raised synchronously with the printing mechanism, rocking thereby a lever 152 which is pivotally mounted at 153 and which engages with its pin 151 into a slot 150 of a lever 148 pivotally mounted upon the shaft 86 of the printing platen and being normally drawn upwardly by a strong spring 149. At the left end of the lever 148 is a shift pawl 144 pivotally mounted engaging with a sidewardly extending projection into the teeth of the ratchet wheel 147 fastened to the platen roller and being held in its position by the bell crank lever 146. If the lever 148 is rocked in clockwise direction due to the raising bar 156 (turning thereby the pawl 144 for the amount of three teeth) the roller 145 of the shift pawl 144 will encounter a plate 140 and will thereby be moved out of engagement with the ratchet wheel. Upon the return movement of the arm 156 the pawl 144 will be moved downwardly under the influence of spring 149; however, the roller 145 will slide upon the plate 140 far enough that the shift pawl will skip two teeth and will engage only the third tooth, thereby effecting a shift step corresponding only to the length of one tooth which corresponds just to the normal distance between two printing lines. This adjustment of the record sheet feed mechanism is for instance used in connection with the above mentioned group accounts. However, if a perforation has to be effected to each printing line, the plate 140 is adjusted in the position shown in Fig. 10 in dotted lines and is secured by means of the set screw 141. The pawl 144 will then be in engagement with the ratchet wheel during the whole backward stroke of the lever 148 and consequently the pawl will rotate the platen for three teeth thereby effecting a sufficient distance between the various record lines and providing a suitable blank space between the various perforations coordinated to the printed lines.

Now the various manners of operation in connection with perforation shall be described on hand of the circuit diagram of Fig. 1.

If it is desirable to punch to each item the identification represented in a certain hole field of the record card, such as for instance the account number, the selector magnets 60 are inserted immediately between the plug contacts 74 and 75 so that from the analyzing brushes 11 the magnets are immediately in series with the accumulator magnets 940 and the printing magnets 380. The selector bars of the punching mechanism are locked in a mechanical way after instantaneous energization of the magnets 60 while the printing and accumulator magnets are included over the contacts 317 into a shunt circuit. If the records to be perforated are group indications or identification designations, total punching will usually not be necessary; however, the total may be taken from the accumulators and punched in the above described way as a group number perforation. In this instance, the selection and adjustment of the various switches of the tabulating machine must be effected for "item printing" so that the various items will be printed and a perforation will be entered to each item in the above described way, said perforation corresponding to the perforation of the record field selected for said purpose, with the only difference that the respective number is represented upon the card according to the single hole system while the perforation upon the record sheet is effected according to the combinational code perforations system; it will, of course, be understood that the invention is independent of the system of perforation.

If group accounts are to be made by means of the automatic group control mechanism it may be desirable to punch the identification or group designation to the first item of each group but to suppress the perforation for each following item of the same group. Further, it may be desirable to print to the first item (in addition to the perforation) the group number, as well as to all other items, or to print said group number only to the first item. In the latter instance (i. e. if the group number is to be punched and printed only in connection with the first item) the magnets 60 and the group indicator contacts 48 must be inserted between the plugs 74 and 75, the magnets 60 lying then in series with the contacts 48. After the passage of the first card, the selector magnets 60 and the printing magnets are switched off from the analyzing brushes due to the interruption of the contacts 48, after the group number has been entered into the accumulator by means of magnets 940. During printing of the following items there will be no printing of the group number and also no perforation of the same, and only upon total taking the group number which has been entered into the accumulator will again be printed by the printing magnets but it will not be punched in the present instance. If it is desirable to print the group number to each item and to punch, however, said number only to the first item of each group, the magnets 60 and contacts 48 are switched in series between the plug contacts 98 and 75. This will cause that after the passage of the first card due to the interruption of the group indicator contacts 48, the magnets 60 will be switched off from the current circuit, and consequently no perforation can be effected during the following items. Simultaneously with the aforesaid switch connection, however, also a direct connection must be made between the contacts 74 and 75 so that the group numbers are entered each time into the printing mechanism and are printed to each item. Also in this instance the group number will normally not be printed together with the total.

Another manner of operation consists therein that all items are only accumulated (but not printed) and then only the total of each group of items may be printed. In this instance it may be desirable that the group number is also punched to the total and, if desirable, the group number may also be printed. For this purpose the magnets 60 are connected directly parallelly to the printing magnets 380 to the plug contacts 99; the group indicator contacts 48 are switched between the plug contacts 74 and 75 so that the group number of the first card is entered into the accumulator and remains adjusted in the same. During the following accumulation of the data of the subsequent cards of a group, the printing mechanism will not be actuated, and if then upon total taking the printing magnets 380 are energized in accordance with the adjustment of the accumulator, the parallelly arranged selector magnets 60 will be energized simultaneously with the magnets controlling printing of the group indication so that the group number will be perforated as well as printed. If it should be desirable to punch the group number without printing the same it is only necessary to exclude the magnets 380 and insert in place thereof the selector magnets 60. Punching of the group number in totaling operations is, of course, not restricted to the above described ways. It is also possible to print the group number under the immediate control of the first card and to punch the same, and then entering the total after completion of the group accumulation. If this manner of operation is chosen it is only necessary to switch the magnets 60 and contacts 48 in series between the plugs 74 and 75.

By means of the above described machine, of course, group accounts of the described kind may also be made without printing the total to each group. For this purpose the group control mechanism is rendered operative and the total taking switches are opened so that only the items of each group will be printed. As has been mentioned above in connection with total printing in group accounts, it is also possible in preparing group accounts without total printing, to punch the group number to the first item of each group and to print the same in addition to said perforation either only to the first item or to all items of the respective group.

I claim:

1. In an automatic perforated record card controlled machine, analyzing means for said record cards, means for feeding said record cards one by one past said analyzing means, accumlating means and a punching mechanism both said accumulating means and said punching mechanism being under the common control of said analyzing means, an automatic group control mechanism responsive to group changes in the perforations of record columns controlling commonly said accumulating means and said punching mechanism and stopping analysis of the subsequent card group upon a group change, means for suppressing the control of said accumulating means by said analyzing means after the passage of the first card of each group while the punching mechanism is controlled by the same analyzing means upon the passage of each record card in accordance with the analysis, total taking means automatically called into action by said group control mechanism upon a group change for taking a total from said accumulating means, means under the control of said total taking means for automatically controlling the same punching mechanism by said accumulating means upon total taking, and means for automatically resuming anaylsis of the subsequent card group after the punching operation.

2. In an automatic perforated record card controlled machine, analyzing means for said record cards, means for feeding said record cards one by one past said analyzing means, accumulating means and a punching mechanism both said accumulating means and said pnuching mechanism being under the common control of said analyzing means, an automatic group control mechanism responsive to group changes in the perforations of record columns controlling commonly said accumulating means and said punching mechanism and stopping analysis of the subsequent card group upon a group change, means for suppressing the control of said accumulating means and of said punching means by said analyzing means after the passage of the first card of each group, total taking means automatically called into action by said group control mechanism upon a group change for taking a total from said accumulating means, means under the control of said total taking means for automatically controlling the same punching mechanism by said accumulating means upon total taking, and means for automatically resuming analysis of the subsequent card group after the punching operation.

3. In an automatic perforated record card controlled machine, analyzing means for said record cards, means for feeding said record cards one by one past said analyzing means, accumulating means under the control of said analyzing means, an automatic group control mechanism responsive to group changes in the perforations controlling said accumulating means and stopping analysis of the subsequent card group upon a group change, means for suppressing the control of said accumulating means after the passage of the first card of each group, total taking means automatically called into action by said group control mechanism upon a group change for taking a total from said accumulating means, a punching mechanism, means under the control of said total taking means for automatically controlling said punching mechanism by said accumulating means upon total taking, and means for automatically resuming analysis of the subsequent card group after the punching operation.

4. In an automatic perforated record card controlled machine, analyzing means for said record cards, means for feeding said record cards one by one past said analyzing means, accumulating means, automatic total taking means, a punching mechanism for a continuous record sheet and means for shifting said record sheet upon each card passage and upon each total taking operation, both said accumulating means and said punching mechanism being under the common control of said analyzing means, an automatic group control mechanism responsive to group changes in the perforations of record columns controlling commonly said accumulating means and said punching mechanism and stopping analysis of the subsequent card group upon a group change, means for suppressing the control of said accumulating means by said analyzing means after the passage of the first card of each group while the punching mechanism is controlled by the same analyzing means upon the passage of each record card in accordance with the analysis, said automatic total taking means being called into action by said group control mechanism upon a group change for taking a total from said accumulating means, means under the control of said total taking means for automatically controlling the same punching mechanism by said accumulating means upon total taking, and means for automatically resuming analysis of the subsequent card group after the punching operation.

5. In an automatic perforated record card controlled machine, analyzing means for said record cards, means for feeding said record cards one by one past said analyzing means, accumulating means under the control of said analyzing means, an automatic group control mechanism responsive to group changes in the perforations controlling said accumulating means and stopping analysis of the subsequent card group upon a group change, means for suppressing the control of said accumulating means after the passage of the first card of each group, total taking means automatically called into action by said group control mechanism upon a group change for taking a total from said accumulating means, a punching mechanism for a continuous record sheet, means for automatically shifting said continuous record sheet past said punching mechanism, means under the control of said total taking means for automatically controlling said punching mechanism by said accumulating means upon total taking, and means for automatically resuming analysis of the subsequent card group after the punching operation.

6. In an automatic machine controlled by perforated record cards, analyzing means for said record cards, means for feeding said record cards one by one past said analyzing means, accumulating means, a punching mechanism for combinational code perforations, both said accumulating means and said punching mechanism being under the common control of said analyzing means, an automatic group control mechanism responsive to group changes in the perforations of record columns controlling commonly said accumulating means and said punching mechanism and stopping analysis of the subsequent card group upon a group change, means for suppressing the control of said accumulating means by said analyzing means after the passage of the first card of each group while for combinational code perforations punching mechanism is controlled by the same analyzing means upon the passage of each record card in accordance with the analysis, total taking means automatically called into action by said group control mechanism upon a change group for taking a total from said accumulating means, means under the control of said total taking means for automatically controlling the same punching mechanism for combinational code perforations by said accumulating means upon total taking, and means for automatically resuming analysis of the subsequent card group after the punching operation.

7. In an automatic machine controlled by perforated record cards, analyzing means for said record cards, means for feeding said record cards one by one past said analyzing means, accumulating means under the control of said analyzing means, an automatic group control mechanism responsive to group changes in the perforations controlling said accumulating means and stopping analysis of the subsequent card group upon a group change, means for suppressing the control of said accumulating means after the passage of the first card of each group, total taking means automatically called into action by said group control mechanism upon a group change for taking a total from said accumulating means, a punching mechanism for combinational code perforations, means under the control of said total taking means for automatically controlling said punching mechanism by said accumulating means upon total taking, and means for automatically resuming analysis of the subsequent card group after the punching operation.

8. In an automatic perforated record card controlled machine, analyzing means for said record cards, means for feeding said record cards one by one past said analyzing means, accumulating means under the control of said analyzing means, a punching mechanism for perforations receiving record fields, an automatic group control mechanism responsive to changes in the perforations of record columns controlling said accumulating means and means for suppressing the control of said accumulating means by said analyzing means after the passage of the first card of each group, means for automatically feeding said perforations receiving record fields one by one into punching position upon response of said automatic group control mechanism, total taking means automatically called into action upon response of said group control mechanism to take a total from said accumulating means, and means for automatically controlling said punching mechanism by said total taking means.

9. In an automatic perforated record card controlled machine, analyzing means for said record cards, means for feeding said record cards one by one past said analyzing means, accumulating means under the control of said analyzing means, a punching mechanism for perforations receiving record fields, an automatic group control mechanism responsive to changes in the perforations of said record columns controlling said accumulating means and means for suppressing the control of said accumulating means by said analyzing means after the passage of the first card of each group, means for automatically feeding said perforations receiving record fields one by one into punching position upon response of said automatic group control mechanism, total taking means automatically called into action upon response of said group control mechanism to take a total from said accumulating means in a plurality of digital orders and for automatically controlling said punching mechanism simultaneously in a plurality of digital orders by said total taking means.

10. In an automatic perforated record card controlled machine, analyzing means for said record cards, means for feeding said record cards one by one past said analyzing means, accumulating means, automatic total taking means, a punching mechanism for a continuous record sheet and means for shifting said record sheet upon each card passage and upon each total taking operation, both said accumulating means and said punching mechanism being under the common control of said analyzing means, an automatic group control mechanism responsive to group changes in the perforations of record columns controlling commonly said accumulating means and said punching mechanism and stopping analysis of the subsequent card group upon a group change, means for suppressing the control of said accumulating means and of said punching mechanism by said analyzing means after the passage of the first card of each group, said total taking means being called into action upon a group change by said group control mechanism for taking automatically a total from said accumulating means, means under the control of said total taking means for automatically controlling the same punching mechanism by said accumulating means upon total taking, and means for automatically resuming analysis of the subsequent card group after the punching operation.

11. In an automatic machine controlled by perforated record cards, analyzing means for said record cards, means for feeding said record cards one by one past said analyzing means, accumulating means, automatic total taking means, a punching mechanism for producing combinational code perforations, both said accumulating means and said punching mechanism being under the common control of said analyzing means, an automatic group control mechanism responsive to group changes in the perforations of record columns controlling commonly said accumulating means and said punching mechanism and stopping analysis of the subsequent card group upon a group change, means for suppressing the control of said accumulating means and of said punching mechanism by said analyzing means after the passage of the first card of each group, said total taking means being called into action by said group control mechanism upon a group change for taking a total from said accumulating means, means under the control of said total taking means for automatically controlling the same punching mechanism by said accumulating means upon total taking, and means for automatically resuming analysis of the subsequent card group after the punching operation.

12. In an automatic perforated record card controlled machine, analyzing means for said record cards, means for feeding said record cards one by one past said analyzing means, accumulating means, automatic total taking means, a punching mechanism for producing combinational code perforations in a continuous record sheet, and means for shifting said record sheet upon each card passage and upon each total taking operation, both said accumulating means and said punching mechanism being under the common control of said analyzing means, an automatic group control mechanism responsive to group changes in the perforations of record columns controlling commonly said accumulating means and said punching mechanism and stopping analysis of the subsequent card group upon a group change, means for suppressing the control of said accumulating means by said analyzing means after the passage of the first card of each group while the punching mechanism is controlled by the same analyzing means upon the passage of each record card in accordance with the analysis, said automatic total taking means being called into action by said group control mechanism upon a group change for taking a total from said accumulating means, means under the control of said total taking means for automatically controlling the same punching mechanism by said accumulating means upon total taking, and means for automatically resuming analysis of the subsequent card group after the punching operation.

13. In an automatic perforated record card controlled machine, analyzing means for said record cards, means for feeding said record cards one by one past said analyzing means, accumulating means, automatic total taking means, a punching mechanism for producing combinational code perforations in a continuous record sheet and means for shifting said record sheet upon each card passage and upon each total taking operation, both said accumulating means and said punching mechanism being under the common control of said analyzing means, an automatic group control mechanism responsive to group changes in the perforations of record columns controlling commonly said accumulating means and said punching mechanism and stopping analysis of the subsequent card group upon a group change, means for suppressing the control of said accumulating means and of said punching mechanism by said analyzing means after the passage of the first card of each group, said total taking means being called into action upon a group change by said group control mechanism for taking automatically a total from said accumulating means, means under the control of said total taking means for automatically controlling the same punching mechanism by said accumulating means upon total taking, and means for automatically resuming analysis of the subsequent card group after the punching operation.

14. In an automatic perforated record card controlled machine, analyzing means for said record cards, means for feeding said record cards one by one past said analyzing means, accumulating means under the control of said analyzing means, an automatic group control mechanism responsive to group changes in the perforations controlling said accumulating means and stopping analysis of the subsequent card group upon a group change, means for suppressing the control of said accumulating means after the passage of the first card of each group, total taking means automatically called into action by said group control mechanism upon a group change for taking a total from said accumulating means, a punching mechanism for producing combinational code perforations in a continuous record sheet, means for automatically shifting said continuous record sheet past said punching mechanism, means under the control of said total taking means for automatically controlling said punching mechanism by said accumulating means upon total taking, and means for automatically resuming analysis of the subsequent card group after the punching operation.

15. In an automatic perforated record card controlled machine, analyzing means for said record cards, means for feeding said record cards one by one past said analyzing means, accumulating means under the control of said analyzing means, a punching mechanism for producing combinational code perforations in perforations receiving record fields, an automatic group control mechanism responsive to changes in the perforations of record columns controlling said accumulating means and means for suppressing the control of said accumulating means by said analyzing means after the passage of the first card of each group, means for automatically feeding said perforations receiving record fields one by one into punching position upon response of said automatic group control mechanism, total taking means automatically called into action upon response of said group control mechanism to take a total from said accumulating means, and means for automatically controlling said punching mechanism by said total taking means.

16. In an automatic perforated record card controlled machine, analyzing means for said record cards, means for feeding said record cards one by one past said analyzing means, accumulating means under the control of said analyzing means, a punching mechanism for producing combinational code perforations in perforations receiving record fields, an automatic group control mechanism responsive to changes in the perforations of record columns controlling said accumulating means and means for suppressing the control of said accumulating means by said analyzing means after the passage of the first card of each group, means for automatically feeding said perforations receiving record fields one by one into punching position upon response of said automatic group control mechanism, total taking means automatically called into action upon response of said group control mechanism to take a total from said accumulating means in a plurality of digital orders and for automatically controlling said punching mechanism simultaneously in a plurality of digital orders by said total taking means.

17. In an automatic perforated record card controlled machine, analyzing means for said record cards, means for feeding said record cards one by one past said analyzing means, accumulating means having a plurality of digital orders under the control of said analyzing means, an automatic group control mechanism responsive to group changes in the perforations controlling said accumulating means and stopping analysis of the subsequent card group upon a group change, means for suppressing the control of said accumulating means after the passage of the first card of each group, a punching mechanism having a plurality of digital orders, total taking means automatically called into action upon a group change by said group control mechanism to take a total from said accumulating means in a plurality of digital orders and for automatically controlling said punching mechanism simultaneously in a plurality of digital orders by said total taking means, and means for automatically resuming analysis of the subsequent card group after the punching operation.

18. In an automatic perforated record card controlled machine, analyzing means for said record cards, means for feeding said record cards one by one past said analyzing means, accumulating means having a plurality of digital orders under the control of said analyzing means, an automatic group control mechanism responsive to group changes in the perforations controlling said accumulating means and stopping analysis of the subsequent card group upon a group change, means for suppressing the control of said accumulating means after the passage of the first card of each group, a punching mechanism for producing combinational code perforations corresponding to a plurality of digital orders, total taking means automatically called into action upon a group change by said group control mechanism to take a total from said accumulating means in a plurality of digital orders and for automatically controlling said punching mechanism simultaneously in a plurality of digital orders by said total taking means, and means for automatically resuming analysis of the subsequent card group after the punching operation.

19. In an automatic perforated record card controlled machine, analyzing means for said record cards, means for feeding said record cards one by one past said analyzing means, storing means and a punching mechanism both said storing means and said punching mechanism being under the common control of said analyzing means, an automatic group control mechanism responsive to group changes in the perforations of record columns controlling commonly said storing means and said punching mechanism and stopping analysis of the subsequent card group upon a group change, means for suppressing the control of said storing means by said analyzing means after the passage of the first card of each group while the punching mechanism is controlled by the same analyzing means upon the passage of each record card in accordance with the analysis, storing result reading means automatically called into action by said group control mechanism upon a group change for reading the result from said storing means, means under the control of said reading means for automatically controlling the same punching mechanism by said storing means upon reading of said storing means, and means for automatically resuming analysis of the subsequent card group after the punching operation.

20. In an automatic perforated record card controlled machine, analyzing means for said record cards, means for feeding said record cards one by one past said analyzing means, storing means and a punching mechanism both said storing means and said punching mechanism being under the common control of said analyzing means, an automatic group control mechanism responsive to group changes in the perforations of record columns controlling commonly said storing means and said punching mechanism and stopping analysis of the subsequent card group upon a group change, means for suppressing the control of said storing means and of said punching mechanism by said analyzing means after the passage of the first card of each group, storing result reading means automatically called into action by said group control mechanism upon a group change for reading the result from said storing means, means under the control of said reading means for automatically controlling the same punching mechanism by said storing means upon reading of said storing means, and means for automatically resuming analysis of the subsequent card group after the punching operation.

21. In an automatic perforated record card controlled machine, analyzing means for said record cards, means for feeding said record cards one by one past said analyzing means, storing means under the control of said analyzing means, an automatic group control mechanism responsive to group changes in the perforations controlling said storing means and stopping analysis of the subsequent card group upon a group change, means for suppressing the control of said storing means after the passage of the first card of each group, storing result reading means automatically called into action by said group control mechanism upon a group change for reading the result from said storing means, a punching mechanism, means under the control of said reading means for automatically controlling said punching mechanism by said storing means upon reading of said storing means, and means for automatically resuming analysis of the subsequent card group after the punching operation.

22. In an automatic perforated record card controlled machine, analyzing means for said record cards, means for feeding said record cards one by one past said analyzing means, storing means under the control of said analyzing means, a punching mechanism for perforations receiving record fields, an automatic group control mechanism responsive to changes in the perforations of record columns controlling said storing means and means for suppressing the control of said storing means by said analyzing means after the passage of the first card of each group, means for automatically feeding said perforations receiving record fields one by one into punching position upon response of said automatic group control mechanism, storing result reading means automatically called into action upon response of said group control mechanism to read the result from said storing means, and means for automatically controlling said punching mechanism by said storing result reading means.

23. In an automatic perforated record card controlled machine, analyzing means for said record cards, means for feeding said record cards one by one past said analyzing means, storing means under the control of said analyzing means, a punching mechanism for perforations receiving record fields, an automatic group control mechanism responsive to changes in the perforations of said record columns controlling said storing means and means for suppressing the control of said storing means by said analyzing means after the passage of the first card of each group, means for automatically feeding said perforations receiving record fields one by one into punching position upon response of said automatic group control mechanism, storing result reading means automatically called into action upon response of said group control mechanism to read the result from said storing means in a plurality of digital orders and means for automatically controlling said punching mechanism simultaneously in a plurality of digital orders by said storing result reading means.

24. In an automatic perforated record card controlled machine, analyzing means for said record cards, means for feeding said record cards one by one past said analyzing means, storing means having a plurality of digital orders under the control of said analyzing means, an automatic group control mechanism responsive to group changes in the perforations controlling said storing means and stopping analysis of the subsequent card group upon a group change, means for suppressing the control of said storing means after the passage of the first card of each group, a punching mechanism having a plurality of digital orders, storing result reading means automatically called into action upon a group change by said group control mechanism to read the result from said storing means in a plurality of digital orders, means for automatically controlling said punching mechanism simultaneously in a plurality of digital orders by said storing result reading means, and means for automatically resuming analysis of the subsequent card group after the punching operation.

25. In an automatic perforated record card controlled machine, analyzing means for said record cards, means for feeding said record cards one by one past said analyzing means, storing means having a plurality of digital orders under the control of said analyzing means, an automatic group control mechanism responsive to group changes in the perforations controlling said storing means and stopping analysis of the subsequent card group upon a group change, means for suppressing the control of said storing means after the passage of the first card of each group, a punching mechanism for producing combinational code perforations corresponding to a plurality of digital orders, storing result reading means automatically called into action upon a group change by said group control mechanism to read the result from said storing means in a plurality of digital orders, means for automatically controlling said punching mechanism simultaneously in a plurality of digital orders by said storing result reading means, and means for automatically resuming analysis of the subsequent card group after the punching operation.

26. In an automatic perforated record card controlled machine, analyzing means for said record cards, means for feeding said record cards one by one past said analyzing means, accumulating means, automatic total taking means, a punching mechanism for producing combinational code perforations in a continuous record sheet, and means for shifting said record sheet upon each total taking operation, said punching mechanism including a matrix stationarily mounted with respect to a rotatable feeding roller for said record sheet and having a front face corresponding to the radius of said roller, the punching stamps being provided in a plurality of rows opposite said matrix and radially to said roller, both said accumulating means and said punching mechanism being under the common control of said analyzing means, an automatic group control mechanism responsive to group changes in the perforations of record columns controlling commonly said accumulating means and said punching mechanism and stopping analysis of the subsequent card group upon a group change, means for suppressing the control of said accumulating means by said analyzing means after the passage of the first card of each group while the punching mechanism is controlled by the same analyzing means upon the passage of each record card in accordance with the analysis, said automatic total taking means being called into action by said group control mechanism upon a group change for taking a total from said accumulating means, means under the control of said total taking means for automatically controlling the same punching mechanism by said accumulating means upon total taking, and means for automatically resuming analysis of the subsequent card group after the punching operation.

27. In an automatic perforated record card controlled machine, analyzing means for said record cards, means for feeding said record cards one by one past said analyzing means, accumulating means, automatic total taking means, a punching mechanism for producing combinational code perforations in a continuous record sheet and means for shifting said record sheet upon each card passage and upon each total taking operation, said punching mechanism including a matrix stationarily mounted with respect to a rotatable feeding roller for said record sheet and having a front face corresponding to the radius of said roller, the punching stamps being provided in a plurality of rows opposite said matrix and radially to said roller, both said accumulating means and said punching mechanism being under the common control of said analyzing means, an automatic group control mechanism responsive to group changes in the perforations of record columns controlling commonly said accumulating means and said punching mechanism and stopping analysis of the subsequent card group upon a group change, means for suppressing the control of said accumulating means and of said punching mechanism by said analyzing means after the passage of the first card of each group, said total taking means being called into action upon a group change by said group control mechanism for taking automatically a total from said accumulating means, means under the control of said total taking means for automatically controlling the same punching mechanism by said accumulating means upon total taking, and means for automatically resuming analysis of the subsequent card group after the punching operation.

28. In an automatic perforated record card controlled machine, analyzing means for said record cards, means for feeding said record cards one by one past said analyzing means, accumulating means under the control of said analyzing means, an automatic group control mechanism responsive to group changes in the perforations controlling said accumulating means and stopping analysis of the subsequent card group upon a group change, means for suppressing the control of said accumulating means after the passage of the first card of each group, total taking means automatically called into action by said group control mechanism upon a group change for taking a total from said accumulating means, a punching mechanism for producing combinational code perforations in a continuous record sheet and means for automatically shifting said continuous record sheet past said punching mechanism, said punching mechanism including a matrix stationarily mounted with respect to a rotatable feeding roller for said record sheet and having a front face corresponding to the radius of said roller, the punching stamps being provided in a plurality of rows opposite said matrix and radially to said roller, means under the control of said total taking means for automatically controlling said punching mechanism by said accumulating means upon total taking, and means for automatically resuming analysis of the subsequent card group after the punching operation.

29. In an automatic perforated record card controlled machine, analyzing means for said record cards, means for feeding said record cards one by one past said analyzing means, accumulating means under the control of said analyzing means, a punching mechanism for producing combinational code perforations in perforations receiving record fields of a record sheet, said punching mechanism including a matrix stationarily mounted with respect to a rotatable feeding roller for said record sheet and having a front face corresponding to the radius of said roller, the punching stamps being provided in a plurality of rows opposite said matrix and radially to said roller, an automatic group control mechanism responsive to changes in the perforations of said record columns controlling said accumulating means and means for suppressing the control of said accumulating means by said analyzing means after the passage of the first card of each group, means for automatically feeding said perforations receiving record fields of the record sheet one by one into punching position upon response to said automatic group control mechanism, total taking means automatically called into action upon response of said group control mechanism to take a total from said accumulating means in a plurality of digital orders, and means for automatically controlling said punching mechanism by said total taking means simultaneously in a plurality of rows of punching stamps corresponding to said plurality of digital orders of said accumulating means.

30. In an automatic perforated record card controlled machine, analyzing means for said record cards, means for feeding said record cards one by one past said analyzing means, accumulating means having a plurality of digital orders under the control of said analyzing means, an automatic group control mechanism responsive to group changes in the perforations controlling said accumulating means and stopping analysis of the subsequent card group upon a group change, means for suppressing the control of said accumulating means after the passage of the first card of each group, a punching mechanism for producing combinational code perforations, said punching mechanism including a matrix stationarily mounted with respect to a rotatable feeding roller for said record sheet and having a front face corresponding to the radius of said roller, the punching stamps being provided in a plurality of rows opposite said matrix and radially to said roller, total taking means automatically called into action upon a group change by said group control mechanism to take a total from said accumulating means in a plurality of digital orders, and means for automatically controlling said punching mechanism by said total taking means simultaneously in a plurality of rows of punching stamps corresponding to said plurality of digital orders of said accumulating means, and means for automatically resuming analysis of the subsequent card group after the punching operation.

MICHAEL MAUL.